(12) United States Patent
Sharpe

(10) Patent No.: US 7,614,376 B2
(45) Date of Patent: Nov. 10, 2009

(54) PHOTON-ION-ELECTRON HYDROGEN GENERATOR PLUG

(76) Inventor: Thomas H. Sharpe, 55 Dorr Dr., North Augusta, SC (US) 29841

( * ) Notice: Subject to any disclaimer, the term of this patent is extended or adjusted under 35 U.S.C. 154(b) by 0 days.

(21) Appl. No.: 12/073,032

(22) Filed: Feb. 28, 2008

(65) Prior Publication Data

US 2009/0095237 A1     Apr. 16, 2009

Related U.S. Application Data

(60) Provisional application No. 60/960,707, filed on Oct. 10, 2007.

(51) Int. Cl.
*F23Q 7/00* (2006.01)
(52) U.S. Cl. .............................. 123/145 A; 123/DIG. 12
(58) Field of Classification Search ................. 123/1 A, 123/2, 3, DIG. 12, 145 A
See application file for complete search history.

(56) References Cited

U.S. PATENT DOCUMENTS

| | | | |
|---|---|---|---|
| 2,565,068 A | 8/1951 | Drabold | |
| 3,980,053 A | 9/1976 | Horvath | |
| 4,111,160 A | 9/1978 | Talenti | |
| 5,143,025 A | 9/1992 | Munday | |
| 5,231,954 A | 8/1993 | Stowe | |
| 5,450,822 A | 9/1995 | Cunningham | |
| 5,799,624 A | 9/1998 | Hsieh | |
| 2002/0100836 A1 | 8/2002 | Hunt | |

FOREIGN PATENT DOCUMENTS

JP         57108465 A   *   7/1982

* cited by examiner

*Primary Examiner*—Noah Kamen
(74) *Attorney, Agent, or Firm*—Richard C. Litman

(57) ABSTRACT

The photon-ion-electron hydrogen generator plug is a plug for generating hydrogen gas from ambient air drawn into the piston chamber of an engine. The plug includes a cathode filament that glows "white hot" when an electric current is supplied thereto. A positively charged anode is disposed adjacent the filament. The plug has an end that opens into the cylinder chamber of the engine. A battery, a rotary switch and a step-up transformer form an electric circuit for supplying electric current to the cathode filament and anode.

7 Claims, 2 Drawing Sheets

PHOTON-ION-ELECTRON HYDROGEN GENERATOR PLUG

CROSS-REFERENCE TO RELATED APPLICATION

This application claims the benefit of U.S. Provisional Patent Application Ser. No. 60/960,707, filed Oct. 10, 2007.

BACKGROUND OF THE INVENTION

1. Field of the Invention

The present invention generally relates to internal combustion engines. More specifically, the present invention is drawn to a photon-ion-electron hydrogen generator plug for disassociating hydrogen from water in the combustion chamber of an internal combustion engine.

2. Description of the Related Art

The rising cost and diminishing supply of hydrocarbon fuels, e.g., gasoline, has increased the criticality of developing or finding alternative fuels. Furthermore, pollution caused by burning hydrocarbon fuels is suspected of creating a "greenhouse" effect in the atmosphere, thereby creating problems that may have a bearing on the future course of human civilization. The use of hydrogen as a fuel to power engines has been contemplated for many years.

Hydrogen is one of the most abundant elements on earth and combustion of this abundant element produces pollution-free water. Unfortunately, hydrogen poses many risks when stored in large quantities, thus creating many problems in making the gas available to the general public. The art would certainly welcome a device that could utilize a virtually inexhaustible supply of a common element to power internal combustion engines, which device would also cause production of pollution-free byproducts. Thus a photo-ion-electron hydrogen generator plug solving the aforementioned problems is desired.

SUMMARY OF THE INVENTION

The photon-ion-electron hydrogen generator plug employs a unique arrangement for generating hydrogen gas from ambient air and water vapor drawn into the piston chamber of an internal combustion engine. The plug includes a cathode filament that glows "white hot" when an electric current is supplied thereto. A positively charged anode is disposed adjacent the filament. The plug has an end that opens into the cylinder chamber of the engine. A battery, a rotary switch and a step-up coil form an electric circuit for supplying electric current to the cathode filament.

Accordingly, the invention presents a hydrogen gas generator capable of generating small amounts of hydrogen gas from water available in the atmosphere. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
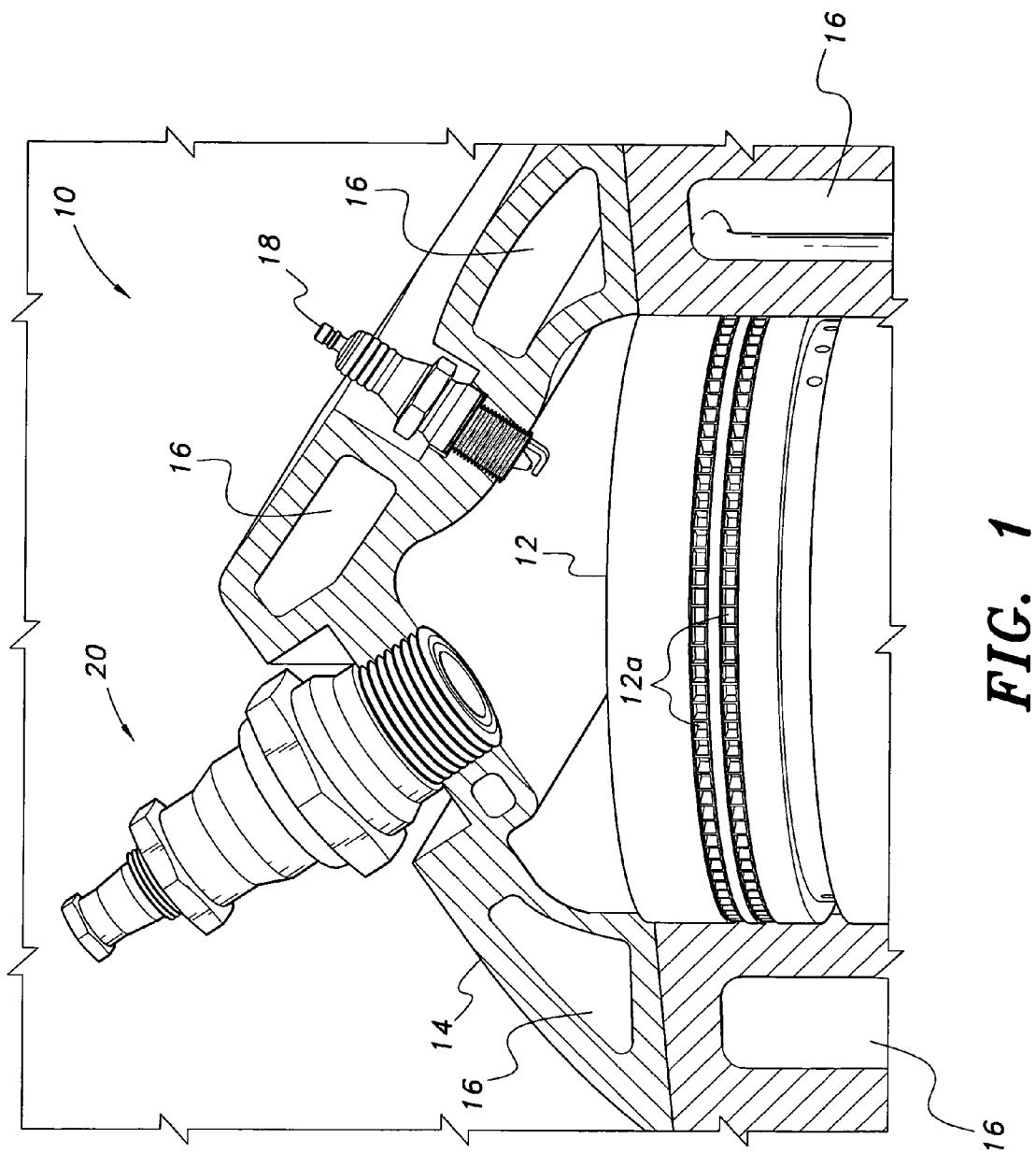
FIG. 1 is an environmental, perspective view of a photo-ion-electron hydrogen generator plug according to the present invention.

Attention is first directed to FIG. 1, wherein an engine cylinder chamber is generally indicated at 10. A piston 12 having rings 12a is housed within chamber 10. The head 14 and the cylinder wall are surrounded by coolant chamber 16. Conventional intake and exhaust valves (not shown) are also disposed on head 14. The structure and arrangement of the aforementioned items are conventional and are not part of the inventive concept, per se. A photon-ion-electron hydrogen generator plug 20 and a conventional spark plug 18 are mounted on head 14. Generator plug 20 and conventional spark plug 18 each have proximate ends disposed within cylinder chamber 10.

Figure 2:
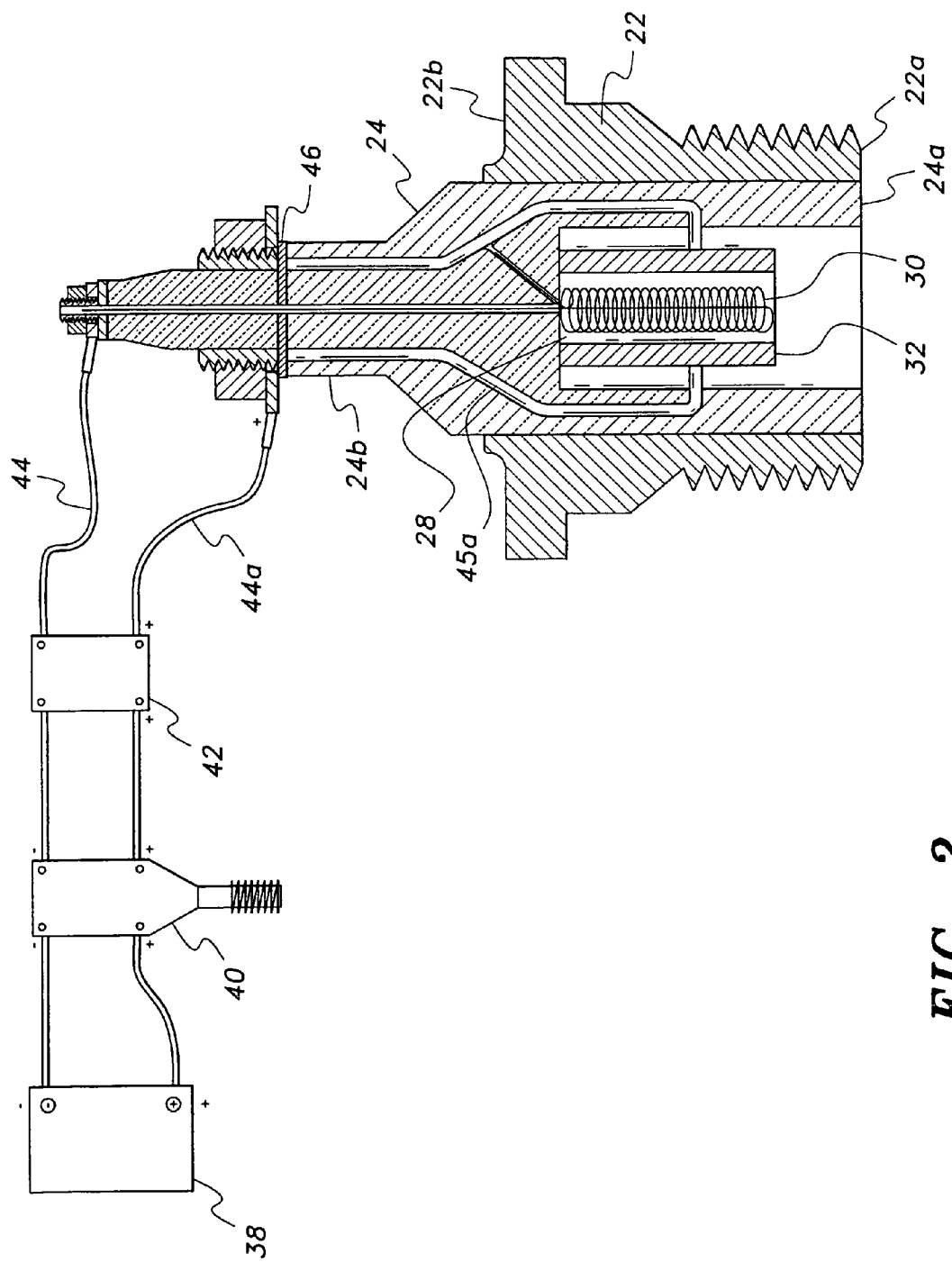
FIG. 2 is a side view in section of a photo-ion-electron hydrogen generator plug according to the present invention.

As best seen in FIG. 2 photon-ion-electron hydrogen generator plug 20 comprises a stainless steel casing member 22 having a circular, threaded proximate end 22a and a distal end 22b. A passageway extends through member 22 from the distal end 22b to proximate end 22a. An insulation member 24 is disposed in the passageway. Member 24 is fabricated from a material having high temperature insulation characteristics. Member 24 has a first end 24a that is disposed adjacent to end 22a. The second end 24b of member 24 extends above the distal end 22b of member 22. A passageway extends through member 24 from second end 24b and terminates at a cavity 28, which cavity is formed in the first end 24a of member 24. A filament member 30 is positioned in cavity 28 and is thereby insulated from the positive conductor 45a. Filament member 30 is fabricated from a metal or a metal mixture that has the ability to emit photons when heated to high temperatures. Member 30 must also have the ability to become "white hot" very quickly when an adequate electrical current is applied thereto. The "white hot" filament 30 emits photons that "crack" the water vapor into the hydrogen and oxygen atoms. As currently contemplated, iron, certain alloys of iron and tungsten exhibit the requisite abilities needed to function as filament member 30. It should be noted however, that any metal or alloy could be utilized if suitable. A charge plate 32 is positioned around filament member 30. Charge plate 32 is fabricated from an alloy of carbon steel, tungsten and pig iron and is embedded in insulation member as is conventionally known in the art. A battery or the like 38 provides electric current via a timed rotary switch 40, a step-up transformer 42, and conductors (preferably fabricated from copper) 44, 44a to filament 30 and charge plate 32, respectively. As seen in FIG. 2, and as known in conventional electrical circuitry, the negative conductor 44 is in electrical connectivity with the filament 30 which forms the cathode heater and then returns to the positive battery terminal thereby completing the circuit and creating the negatively charged cathode for the positively charged hydrogen atoms; and the positive conductor 44a is attached to and is in electrical connectivity with the upper screw threads of the conductor 45a, conductive washer 46 and charge plate 32 thereby creating a positive charge for negatively charged oxygen atoms. As is conventionally known in the art, there is no need for the anode to return to complete the circuit since it will have a positive charge without getting "white hot".

In use, ambient air containing water vapor is drawn into the cylinder chamber on the intake stroke. The air-water vapor mixture is compressed during the compression stroke, changing the water vapor to steam. The air-steam mixture is forced into the generator plug. At an appropriate time that is correlated with a piston position just before dead center, rotary switch 40 opens to supply current to filament 30 so that the filament glows white-hot and emits photons. The photons function to dislodge the electrons of the steam molecules, thus causing the now positive hydrogen atoms to disassociate from the negative oxygen atoms. Positively charge plate 32 (anode) will function to attract the oxygen atoms. Plate 32 functions as a catalyst. Filament 30 (cathode) will function to attract the positively charged hydrogen atoms. Hydrogen gas moves from the cathode into chamber 10 where spark plug 18 is fired to ignite the mixture, which mixture burns thereby creating a high gas pressure to drive the piston.

It is to be understood that the present invention is not limited to the embodiment described above, but encompasses any and all embodiments within the scope of the following claims.

I claim:

1. An engine combustion chamber plug, comprising:
   a casing member having an externally threaded emitter portion adapted for threading into an engine combustion chamber, the emitter having a cavity disposed along an axial center of the casing member, the cavity having sidewalls forming a charge plate, the casing member having an electrode connecting portion;
   external threads disposed on the electrode connecting portion of the case member, the external threads being adapted for connecting a positive electrode thereto for energizing the charge plate;
   a passageway extending lengthwise from the cavity of the emitter portion of the casing into the electrode connecting portion of the casing;
   an electrically conductive tip disposed on the electrode connecting portion and extending upward from the passageway, the electrically conductive tip being adapted for electrical connection of a negative electrode thereto;
   a hollow insulation member disposed in the passageway, the insulation member being fabricated from a material having high temperature insulation characteristics; and
   a filament coil disposed in the cavity, the filament coil emitting photons when heated to high temperatures, the coil having one end routed through the hollow insulation member and electrically connected to the tip, and an opposite end electrically connected to the external threads on the electrode connecting portion of the casing;
   wherein when an electrical current is applied to the electrode connections of the plug while it is operationally attached to the combustion chamber, the filament glows white hot, emitting photons to improve combustion in the chamber.

2. The engine combustion chamber plug according to claim 1, further comprising:
   a DC power source having a pair of electrodes;
   a step-up transformer having a primary input and a secondary output, the secondary output having a connection to the tip and the external threads on the electrode connecting portion of the plug casing; and
   a rotary switch having a first and a second pair of terminals, the first pair of terminals being connected to the battery electrodes, the second pair of terminals being connected to the primary input of the step-up transformer; and
   wherein timing of the rotary switch delivers power to the plug at a time correlated with a piston in the combustion chamber being positioned immediately in advance of dead center.

3. The engine combustion chamber plug according to claim 2, wherein the transformer connection to the tip and the external threads on the electrode connecting portion of the plug casing comprises copper conductors.

4. The engine combustion chamber plug according to claim 1, wherein the filament coil is fabricated from a metal predisposed to photon emission when heated to high temperatures.

5. The engine combustion chamber plug according to claim 4, wherein the metal is iron.

6. The engine combustion chamber plug according to claim 4, wherein the metal is tungsten.

7. The engine combustion chamber plug according to claim 4, wherein the filament coil is fabricated from a metal alloy predisposed to photon emission when heated to high temperatures.

\* \* \* \* \*